Aug. 10, 1965  G. R. CHURCHILL  3,199,919
METHOD OF MAKING A BUFFING WHEEL
Original Filed May 21, 1959  5 Sheets-Sheet 1

INVENTOR.
George R. Churchill
BY
Robert R. Churchill
ATTORNEY

INVENTOR.
George R. Churchill
BY
Robert R. Churchill
ATTORNEY

Aug. 10, 1965  G. R. CHURCHILL  3,199,919
METHOD OF MAKING A BUFFING WHEEL
Original Filed May 21, 1959  5 Sheets-Sheet 3
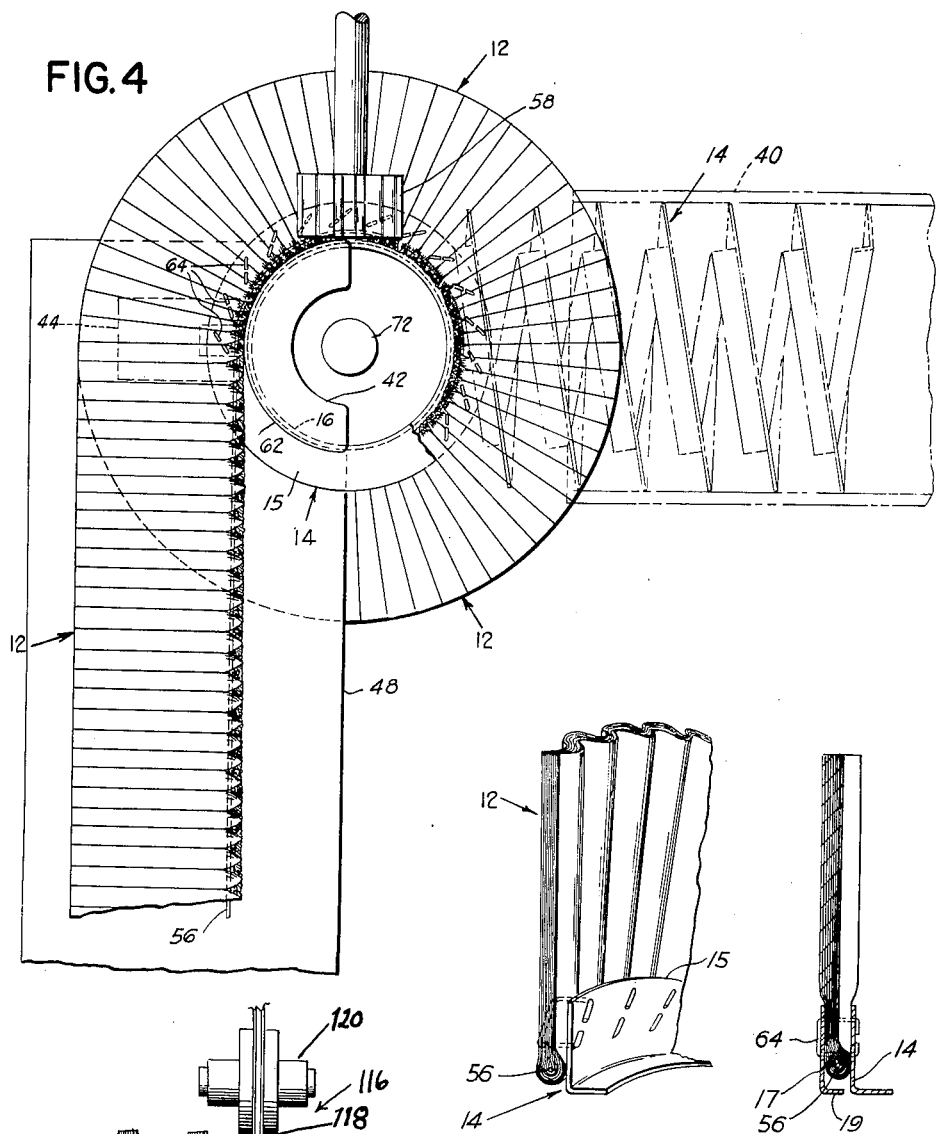
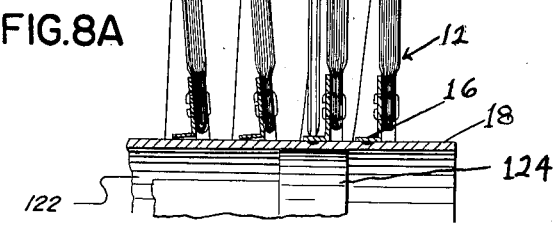
INVENTOR.
George R. Churchill
BY Robert R. Churchill
ATTORNEY

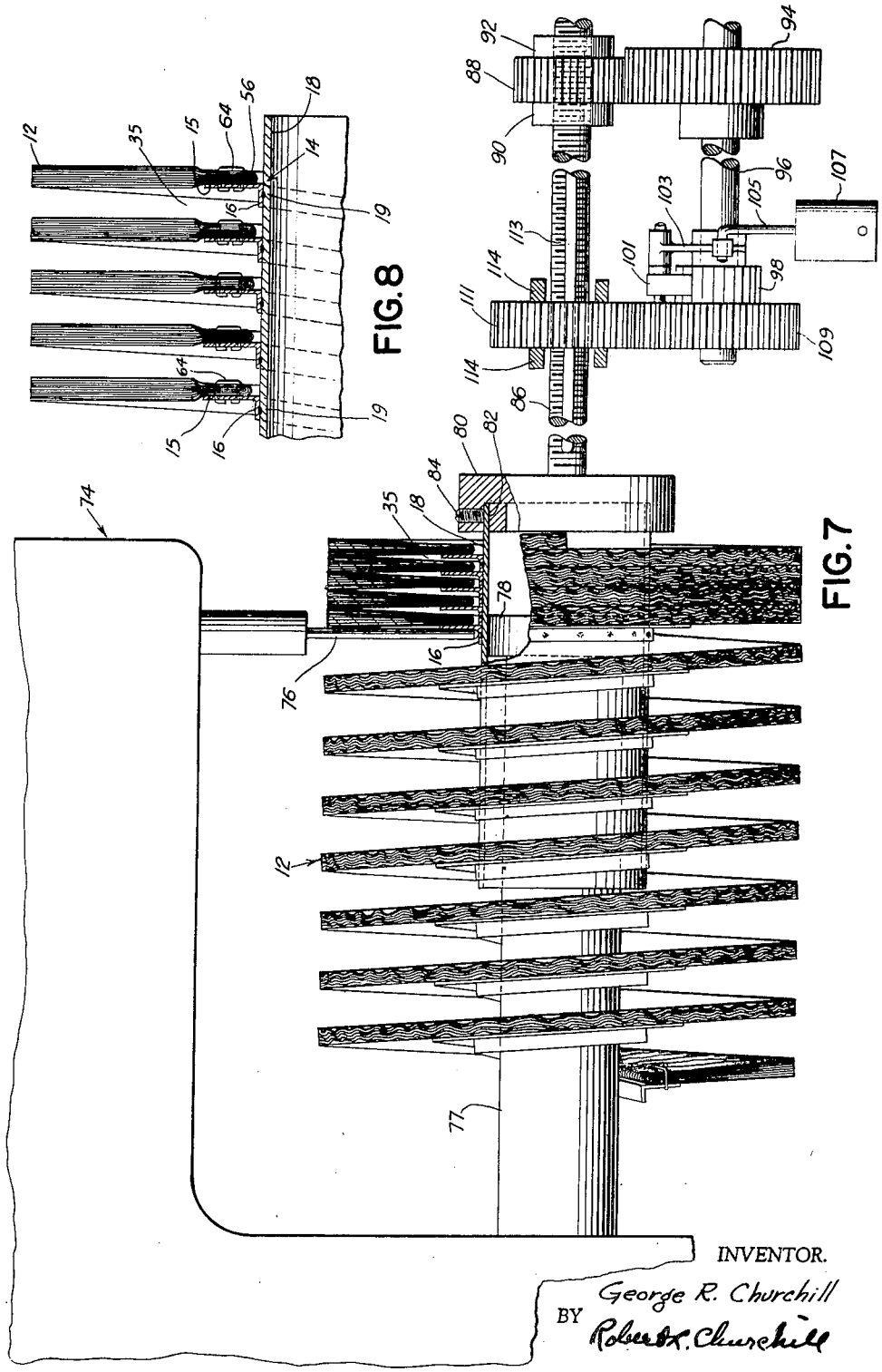

Aug. 10, 1965    G. R. CHURCHILL    3,199,919
METHOD OF MAKING A BUFFING WHEEL
Original Filed May 21, 1959    5 Sheets-Sheet 5
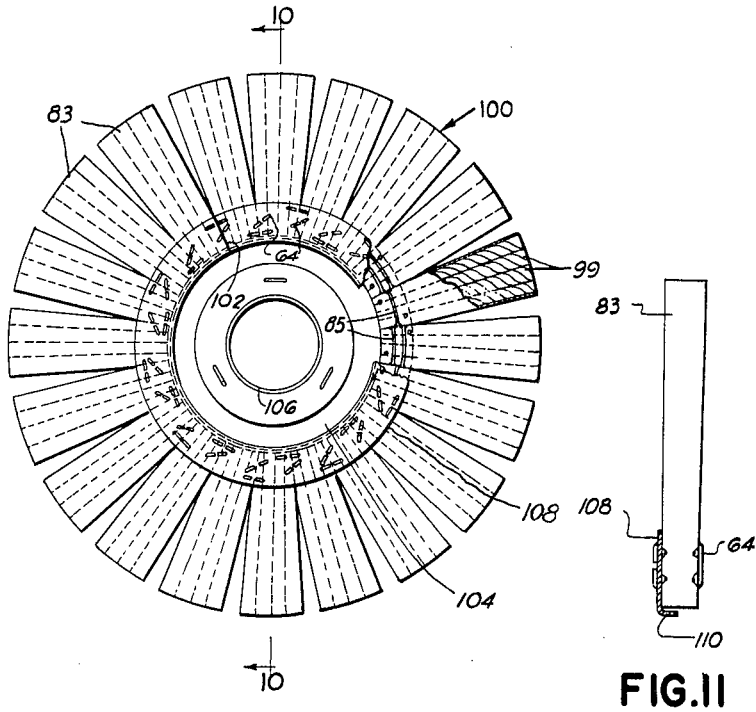
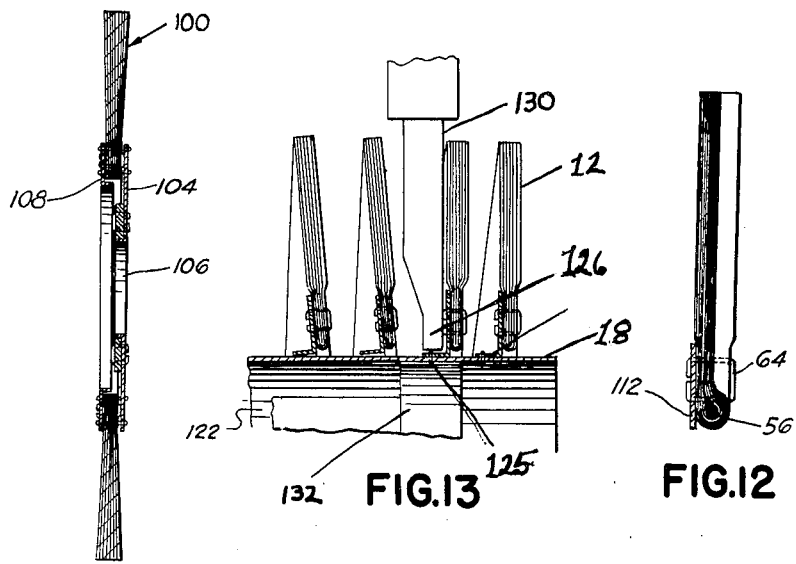
INVENTOR.
George R. Churchill
BY Robert R. Churchill
ATTORNEY United States Patent Office 3,199,919
Patented Aug. 10, 1965

3,199,919
METHOD OF MAKING A BUFFING WHEEL
George R. Churchill, Cohasset, Mass., assignor to George R. Churchill Company, Inc., Hingham, Mass., a corporation of Massachusetts
Original application May 21, 1959, Ser. No. 814,750, now Patent No. 3,086,333, dated Apr. 23, 1963. Divided and this application Nov. 23, 1962, Ser. No. 239,481
16 Claims. (Cl. 300—21)

This application is a division of my copending application for a Buffing Wheel, Serial No. 814,750, filed May 21, 1959, and now Patent No. 3,086,333.

This invention relates to a method of making a buffing wheel or device.

The invention has for an object to provide a novel and improved method of making a buffing wheel and particularly a roll type of buffing wheel whereby the buffing wheel may be produced in a novel, efficient and economical manner.

With this general object in view and such others as may hereinafter appear, the invention consists in the method of making a buffing wheel as hereinafter described and particularly defined in the claims at the end of this specification.

In the drawings:

FIG. 4 is a plan view of the same;

FIG. 5 is a perspective view of a portion of the helically formed buffing element;

FIG. 6 is an end view detail of a modified form of buffing element may be used in practicing the method of producing the present buffing wheel;

FIG. 7 is a side elevation diagrammatically illustrating apparatus for securing the helically formed buffing element to a tubular core member in accordance with the present method;

FIG. 8 is a cross sectional detail illustrating a portion of a modified buffing wheel produced in accordance with the present invention;

FIG. 8A is a side elevation diagrammatically illustrating a modified form of apparatus for securing the buffing element to the tubular core member;

FIG. 9 is a front elevation, partly broken away, of a single section buffing wheel made from a ring of a modified form of a helically formed buffing element;

FIG. 10 is a vertical section taken on the line 10—10 of FIG. 9;

FIGS. 11 and 12 are detail views of modified forms of buffing element produced in accordance with the present invention; and FIG. 13 is a side elevation similar to FIG. 8A illustrating a still further modified form of apparatus for securing the buffing material to a tubular core member.

In general the present invention contemplates a novel and improved method of making a roll type buffing wheel or device which is adapted to be mounted on a rotary arbor and a novel and improved buffing element constructed in a novel manner which is particularly adapted for use in the construction of the present buffing roll. In one form of the present invention an elongated strip of buffing material is initially secured to a helical thin metal band, and an elongated helical section of the buffing material thus produced is then permanently secured to a tubular thin metal core member to produce a helically wound type of buffing roll adapted to be mounted on a rotary arbor. While the elongated strip of buffing material may comprise any suitable continuous strip, such as a continuous web of multi-ply layers of cloth, it may comprise a strip of connected individual elongated buffing elements comprising multifolded lengths of cloth, or combined cloth and sisal elements, or other buffing material.

Figure 1:
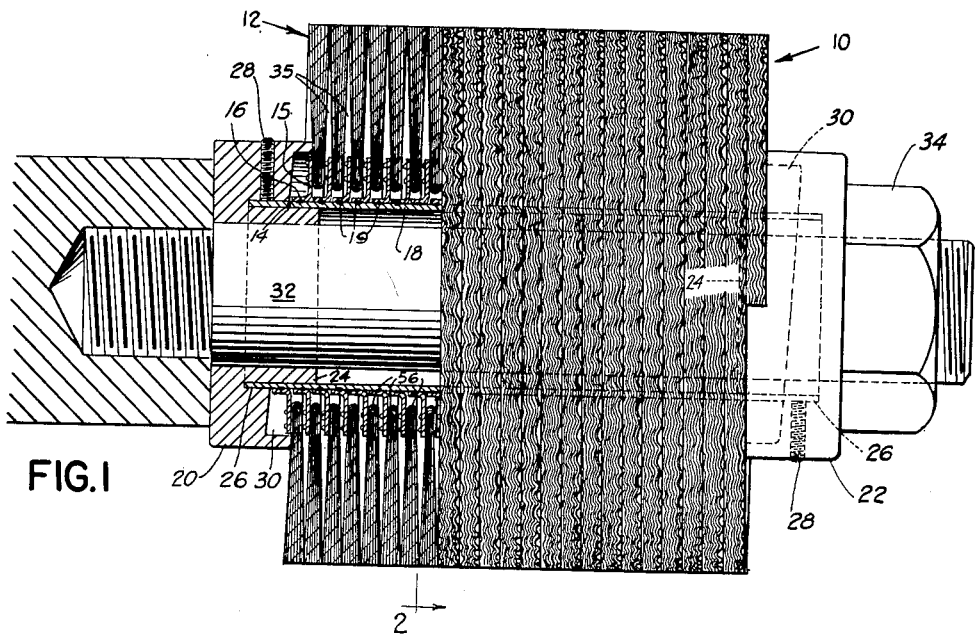
FIG. 1 is a side elevation partly in cross section of a roll type buffing wheel produced in accordance with the present invention.
Figure 2:
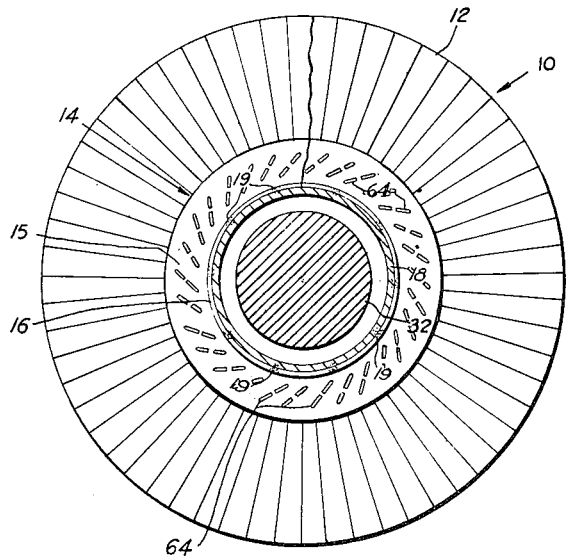
FIG. 2 is a vertical cross section taken on the line 2—2 of FIG. 1.

Referring now to the drawings, 10 represents a roll type buffing wheel embodying the present invention and which comprises a helically formed buffing element 12 initially secured to a helically shaped springlike thin metal band 14 which may be L-shaped in cross section, as shown in FIG. 1, one leg 15 of the L being secured to the buffing material and the other leg providing a laterally extended flange 16. In assemblying the buffing wheel, a section of the helically formed buffing element 12 may be fitted over a hollow central core or thin metal tube 18, and the flange portions 16 may be permanently secured to the tube 18 by spot welding as indicated at 19. As illustrated in FIG. 1, end collars 20, 22 may be provided, one at each end of the tube, each collar having a tubular extension 24 fitted within the tube, the ends of the tube 18 being seated in a circular groove 26 formed in the end of each collar, one side of each groove 26 being coextensive with the outside diameter of its tubular extension 24 as shown. Each collar 20, 22 is retained on the tube by a set screw 28, and the inner end of each collar is also provided with a recessed portion 30 having an inclined and offset surface shaped for cooperation with and to correspond to the inclined and offset portion of the end of the springlike metal band 14 and the buffing material 12 secured thereto. The buffing roll unit 10 thus constructed may be placed over an arbor 32 and secured thereto by a nut 34. It will be observed that the pressure of the nut 34 against the end collars 20, 22 is directed against the ends of the tube 18 seated in the grooves 26, thus limiting the inward movement of the collars to avoid any clamping action against the buffing material. In this manner the fixed relationship of the convolutions of the buffing element, permanently secured to the tube, is not disturbed. In practice the buffing material extends radially from the periphery of the tube, and as thus constructed, the outer surface or periphery of the helically formed type of buffing roll unit presents a continuous buffing surface of substantially uniform density to enable the buffing operation to be performed in an efficient and substantially streak-free manner. It will also be observed that in practice the spacing between the convolutions of the helically formed buffing element, afforded by the L-shaped metal band secured to the tube, provides an air space 35 between the convolutions which enables the heat generated during the buffing operation to be dissipated and thus provide a cooler running buffing unit whereby the wearing life of the unit is substantially increased.

Figure 3:
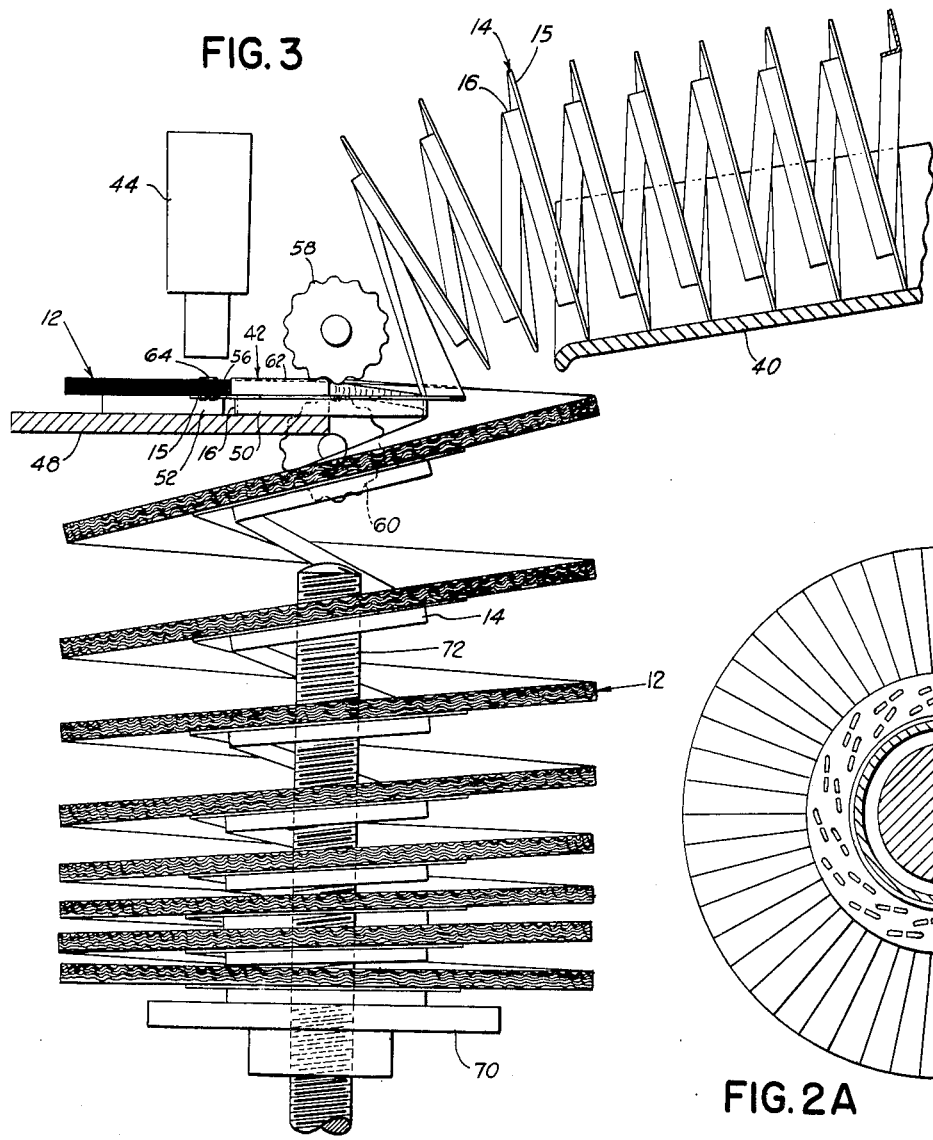
FIG. 3 is a side elevation diagrammatically illustrating apparatus for producing a helically formed buffing element utilized in practicing the present method of producing a buffing wheel.

Referring now to FIGS. 3 and 4 diagrammatically illustrating apparatus for producing the helically formed buffing element 12 in accordance with the present invention, it will be observed that provision is made for securing an elongated strip of the buffing material to the coils or convolutions of the helically formed metal band 14 in a continuous and rapid manner. As herein shown, a continuous length of the springlike helically formed metal band 14 is loosely supported in an inclined trough 40, and the leading coil or convolution of the band may be resiliently expanded or opened up to present the same in a horizontal position and disposed about a curved or semicircular guide member 42 in operative relation to a stapling head diagrammatically indicated at 44. As shown in FIG. 3, the guide member 42 is supported on a plate 48, and the flange portion 16 of the L-shaped band extends vertically against a lower recessed portion 50 of the guide member 42 with the longer leg 15 of the L extending horizontally over the anvil portion 52 of the stapling device. The buffing material, herein shown as a web of multi-ply cloth folded upon itself about a wire 56 to form a U-shaped strip and provided with transversely extended corrugations, may be guided on top of the coil thus disposed with the folded marginal portion thereof superimposed on the leg 15 of the metal band and in operative relation to the stapling head. The leading edges of the superimposed strip and coil are then extended between a pair of intermittently operated serrated or grooved feed rollers 58 and 60. It will be observed in FIG. 3 that the upper portion 62 of the guide member 42 provides a shoulder against which the inner or folded edge of the strip of buffing material is guided to maintain the inner edge of the material offset outwardly from the inner edge or flange portion 16 of the L-shaped band 14 for a purpose which will be hereinafter described.

In operation the stapling device is actuated to apply a staple 64 through the multi-ply cloth and the leg 15 of the metal band, the staple being clinched by the anvil 52 over the underside of the leg 15. During the upstroke of the stapling device the feed rollers 58, 60 are rotated to advance the material gripped therebetween a predetermined distance whereupon a second staple spaced from the first is applied, repeated cycles of the stapling device effecting advance of the material and application of successive staples to form a continuous length of helically shaped buffing material extended below the stapling head as shown in FIG. 3. It will be apparent that as the combined cloth and helical band material comprising the present buffing element is intermittently advanced by the feed rollers the helically formed metal band 14 is rotated and advanced a corresponding distance in its inclined supporting trough 40 to present successive convolutions of the helically formed band to the stapling head. It will also be observed that the combined buffing element 12 is likewise correspondingly rotated and advanced downwardly. In order to relieve the weight of the downwardly extended combined buffing material and to prevent excessive expansion of the convolutions of the material, the lower end thereof may be supported on a disk 70 threadedly adjustable on an upright threaded post 72. In practice the disk 70 may be adjusted downwardly on the post 72 as the material is advanced downwardly during successive stapling operations. Also, in practice the spacing and angular relationship between successive staples may be varied, and in order to permit relatively close arrangement of successive staples when required, they may be applied at an angle of about 45° relative to the line of advance of the strip of buffing material as shown. FIG. 5 illustrates in detail a portion of the helically formed buffing element thus produced, the flange 16 of the helical band 14 being provided to permit the combined element in its helical form to be secured to the metal tube 18. FIG. 6 illustrates a modified form of helically formed buffing element produced in accordance with the present invention, one side of the strip of buffing material being provided with a helical band 14 adapted to be welded to the tube 18, the other side of the strip having a second helical band 17 provided with an inturned flange 19, the second band being provided to increase the strength and rigidity of the assembled buffing element. In producing the modified buffing element both bands may be fed simultaneously with the buffing material into operative relation to the stapling head, and the staples are applied through the upper band, buffing material, and the lower band and clinched under the lower band.

Figure 2A:
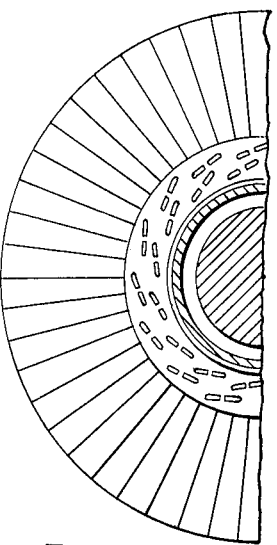
FIG. 2A is a sectional view similar to FIG. 2 of a modified buffing element showing a double row of staples.

As illustrated in FIG. 2A, in some instances, for example, in buffing wheels of relatively large diameter, the strip of buffing material may be secured to the helical band by a plurality of rows of staples whereby the "pull out" strength of the buffing element is substantially increased. While, as shown, it may be preferred to set the staples at an angle relative to one another they may be set tangential to the center of the roll or individual buffing wheel section formed from the present combined material.

The helically formed metal band 14 may comprise a relatively thin material preferably between .020" and .035" in thickness, and the wall thickness of the tube 18 may be about .020" to .040" so that the parts may be readily secured together. The metal tube 18 may be inexpensively produced by rolling a flat sheet into tubular form and spot welding the seam at spaced intervals, or, if desired, any commercially available tubing of the proper gauge may be used. Also, the parts may be made in different proportions, that is, the tube diameter may be varied, and the width of the buffing material may likewise be varied to produce buffing roll units of different diameters and lengths.

The preferred manner of securing an elongated section of the helically formed buffing material 12 to the relatively lightweight metal tube 18 is illustrated in FIG. 7 wherein 74 represents a welding device having a vertically reciprocable welding rod 76 and an elongated horizontally extended insulated supporting cylinder 77 provided with a metal collar 78 at its outer end for cooperation with the welding rod 76. In operation the tubular core member 18 with an elongated section of the helically formed buffing element 12 loosely placed thereover is fitted over the supporting cylinder 77 and the collar 78 in operative relation to the welding rod 76. The leading end of the buffing element is then placed in operative relation to the vertically reciprocable welding rod 76 with the flange portion 16 against the periphery of the metal tube 18, and the first spot weld is made. Thereafter, the tube 18 is rotated through a short arc and also simultaneously moved outwardly a short distance, so as to provide in effect an outward spiral movement of the tube, and a second spot weld spaced from the first weld is made, successive spot welds being made after each spiral movement of the tube 18 on the stationary arm 77 and collar 78 until the entire section of the elongated helical buffing element 12 is spot welded to the tube. It will be observed that the leading end of the helical section is spaced a short distance fro mthe outer end of the tube 18 leaving the end free to receive the collar 20 subsequently assembled thereon, and the length of the helically formed section may be such as to terminate a short distance from the inner end of the tube to provide space for the second collar 22.

It will also be observed that the leanding end of the helical section is disposed with the flange portion 16 extended laterally away from the buffing material and with the buffing material secured to the outer face of the vertical leg 15 of the L-shaped band. Thus, as the spot welding operation proceeds it will be seen that the outer face of one convolution of buffing material may extend over or above the flange portion 16 of the preceding convolution as permitted by the offset of the marginal edge of the strip of buffing material and the flange 16 as described. Thus, successive convolutions of the buffing element may be closely spaced as shown in FIGS. 1 and 7 if desired. However, the thickness of the buffing material being slightly less than the width of the flange, a small continuous helical air space 35 is provided between successive convolutions of the buffing material for the dissipation of heat during the buffing operation.

It will be apparent that by changing the arcuate distance of successive intermittent rotary movements during the time between the strokes of the vertically reciprocable welding rod, the spacing between the spot welds may be varied, and also, by changing the extent of the simultaneous outward movement of the tube, the pitch of the successive convolutions may be varied. Thus, as shown in FIG. 8, a buffing roll unit having more widely spaced convolutions may be produced when required for certain buffing operations, particularly when a soft buffing action is required, and the convolutions may be compacted together when a more dense and harder buffing surface is required.

Suitable mechanism may be provided for effecting automatic outward spiral movement of the tube 18 during the time between strokes of the spot welding rod 76 and, as herein shown, a collar 80 having a circular groove 82 formed in the end thereof is adapted to receive the outer end of the tube 18 to which it is secured by a set screw 84. The collar 80 is formed on the end of a threaded rod 86 which may extend through a threaded opening in a gear 88 supported between lugs 90, 92 of a suitable frame, not shown, to prevent lateral movement of the gear. The gear 88 is in mesh with a drive gear 94 mounted fast on a shaft 96 which may be intermittently rotated through connections from the welding machine. As herein illustrated, such connections may include a ratchet 98 fast on the shaft 96 and a cooperating pawl 101 carried by one arm of a bell crank 103 pivotally mounted on the shaft 96, the other arm being connected to the piston rod 105 of an air cylinder 107 under the control of the welding machine. A second gear 109 mounted on the shaft 96 and formed integrally with the ratchet 98 is in mesh with a gear 111 mounted on the threaded rod 86. The gear 111 is provided with a clearance opening therein and a keyway for cooperation with an elongated key 113 provided on the threaded rod 86. The gear 111 is also held from lateral movement by frame lugs 114.

In operation, during the downstroke of the welding rod 76, the pawl 101 is retracted, and during the upstroke of the welding rod the pawl is rocked to rotate the shaft 96 through a predetermined arcuate distance. Rotation of the threaded gear 88 will effect axial outward movement of the threaded rod 86, and rotation of the gear 111 will effect rotation of the threaded rod through a predetermined arcuate distance. Thus, the tube 18 is given an outward spiral movement each cycle of the welding machine to determine the pitch of the convolutions of the helically formed buffing unit and also the arcuate distance between the spot welds. In practice after a buffing unit is completed and removed provision is made for resetting the threaded rod 86 in readiness for receiving and spot welding a succeeding buffing unit. The resetting mechanism, not shown, may be either manual or motor driven to reverse the direction of rotation of the threaded rod after releasing the pawl 101. It will be apparent that gears of different ratios may be provided to vary either the pitch of the buffing element on the tube 18, or to vary the spacing between spot welds. While it may be preferred to secure the helically shaped buffing element 12 to the tube 18 by spot welding, as hereintofore described, the buffing element 12 may be secured to the tube by wire stitching (stapling) or may be continuously welded thereto.

Referring now to FIG. 8A, 116 indicates in general a continuous or seam welding device which is particularly adapted to continuously weld the elongated strip of helically formed buffing material 12 to a metal tube 18 and includes a rotatable welding electrode 118 mounted for rotation on a shaft 120 rotatably mounted in a suitable supporting frame, not shown, and an insulated supporting member 122 provided with a collar 124 for cooperation with the welding electrode or wheel 118. In operation the helically formed buffing element 12 is placed on the tube 18 which is fitted over supporting member 122 and collar 124 such that the leading end of the element 12 is engaged by the welding electrode 118. The tube 18 is continuously rotated and moved outwardly in a spiral movement, the welding electrode 118 rolling on the flange 16 of the element 12 and continuously welding the same to the tube 18. The continuous rotation and outward spiral movement of the tube 18 may be effected in any suitable manner, such as by mechanism similar to that illustrated in FIG. 7, modified to be continuously driven. Upon completion of the welding operation the unit may be removed from the supporting member 122, the apparatus reset and a new unit positioned thereon for welding.

In another modified form of the invention, as illustrated in FIG. 13, the helically shaped buffing element 12 may be secured to a tubular core member 18 by wire stitching or staples 125. The tube 18 is fitted on a supporting member 122 similar to that illustrated in FIG. 8A such that the leading end of the buffing element 12 is supported in operative relation to the stapling head 126 of a commercially available automatic stapling machine, indicated diagrammatically at 130. The supporting member 122 is provided with a collar or anvil 132 arranged to engage and clinch over the staples 124 as they are driven by the stapling head through the flange 16 and tube 18 to firmly secure the helically shaped buffing element 12 to the tube. In operation the tube 18 is arranged to be rotated and spirally moved outwardly by mechanism similar to that illustrated in FIG. 7 such that each convolution of the element 12 is securely fastened to the tube 18 by the stapling machine, the stapling machine operating in timed relation to the outward spiral rotation of the tube. After the stapling operation is completed the completed unit may be removed from the supporting member 122, the apparatus reset and a new unit placed in readiness for a succeeding stapling operation.

From the description thus far it will be seen that the present invention provides a novel helically formed buffing element produced by stapling a strip of buffing material to a helically formed, relatively thin metal band having a flange portion adapted to be spot welded, continuously welded or stapled to a central core member to produce a helically wound type of buffing roll in a rapid and economical manner. While the buffing material shown in FIGS. 1 to 8 has been illustrated as comprising a web of multi-ply cloth folded into a U-shape in cross section and provided with transverse corrugations, it will be understood that any suitable buffing material may be used in practicing the present invention, such as a multi-ply strip of unfolded cloth, or individual lengths of any suitable buffing material, or a strip of individual elongated connected and relatively narrow multifolded cloth buffing elements as indicated at 83 in FIG. 9 which may be joined together at their lower ends in any suitable manner such as by weaving wires 85. Such elongated elements may also include buffing elements embodying a bunch of sisal twine enclosed within a cloth sheath, as indicated at 99 in FIG. 9, from a strip of the helically formed buffing material. A single convolution may be severed from the strip and its ends joined in any suitable manner to form a closed ring thereof, the joint being indicated at 102. As illustrated in FIG. 10, the ring may be joined by stapling it to a relatively thin metal disk 104 having a central flanged opening 106 adapted to fit over a rotary arbor. A plurality of such single sections may be mounted side by side on an arbor and clamped together to provide an elongated buffing surface.

The helically formed metal band, shown L-shaped in cross section in FIGS. 1 to 8, is particularly adapted to be welded to a hollow metal core as described. However, the helical metal band may take other forms in cross section when the helical buffing element is not to be welded. As shown in FIG. 11, the band 108 may have a relatively short flange 110 extended inwardly under the inner edge of the buffing material or, as shown in FIG. 12, a flat band 112 may be used. Such modified forms of helically shaped buffing elements may be employed to produce single section buffing wheels, as described, or an elongated helical section may be clamped or otherwise secured to a rotary arbor to produce a buffing wheel or roll.

It will be seen that in practice in assembling an elongated helical section of the buffing element with the tubular core member, the pitch of the convolutions may be varied to produce either a hard or a soft buffing roll unit. When a relatively hard buffing action is desired, the convolutions may be closely spaced to form a compact buffing surface, and when a soft buffing action is desired the convolutions may be more widely spaced. In either event sufficient space is provided between the lower ends of successive coils to provide in effect a helical air space for cooling purposes.

While the preferred embodiment of the invention has been herein illustrated and described, it will be understood that various changes may be made in the proportions and details of construction of the invention described herein without departing from the principles of the invention.

Having thus described the invention, what is claimed is:

1. The method of making a helically formed buffing element which comprises the steps of placing together and applying a fastening element through the leading ends of a helically shaped, freely movable metal band and a marginal portion of an elongated strip of buffing material, guiding and advancing the assembled parts through a rotary path and applying successive fastening elements through the parts in spaced relation throughout the length of the parts to provide an elongated helically formed buffing element for use in making a buffing device.

2. The method of making a helically formed buffing element which comprises the steps of supporting an elongated section of a preformed helically shaped thin metal band in a plane inclined upwardly from the horizontal, expanding the foremost convolution to a horizontal plane and placing the leading end in operative relation to a fastening device, supporting an elongated strip of buffing material horizontally and superimposing the leading end of a marginal portion thereof upon the leading end of the band, applying a fastening element through the parts, guiding and advancing the assembled parts through a rotary path, and applying successive fastening elements in spaced relation throughout the length of the parts to provide an elongated helically formed buffing element for use in making a buffing device.

3. The method of making a helically formed buffing element as defined in claim 2 wherein the assembled parts are intermittently advanced and are subjected to a stapling operation between periods of movement of the parts.

4. The method of making a buffing element as defined in claim 3 wherein the helically shaped band is free to rotate in its support during the advancing movement of the parts, successive convolutions thereof being expanded and presented in a horizontal plane as the fastening operation proceeds.

5. The method of making a helically formed buffing element which comprises the steps of guiding and advancing through a rotary path superimposed portions of an independently movable, elongated helically shaped rigid band and a marginal portion of an elongated strip of buffing material, and securing together by means extending through the parts the superimposed portions to provide an elongated helically formed buffing element for use in making a buffing device.

6. The method of making a helically wound type of buffing roll unit which comprises the steps of placing a helically shaped buffing element having a rigid band connected to the inner marginal portions thereof in surrounding relation to a cylindrical core member, and permanently securing the inner marginal portions of the convolutions of the helically shaped element to the cylindrical member.

7. The method of making a helically wound type of buffing roll which comprises the steps of placing a helically shaped buffing element having a rigid band connected to the inner marginal portions thereof in surrounding relation to a tubular core member, and permanently fastening the inner marginal portions of the convolutions of the helically shaped buffing element to the tube at spaced points along successive convolutions.

8. The method of making a buffing roll as defined in claim 7 wherein the band connected to the inner marginal portions of the helically shaped buffing element is provided with a laterally extended flange secured to the tube by wire stitching.

9. The method of making a helically wound type of buffing roll which comprises the steps of placing a helically shaped buffing element having a rigid band provided with a lateral extension connected to the inner marginal portions thereof in surrounding relation to a tubular core member, permanently fastening the leading end of the lateral extension of the inner marginal portion of the element adjacent one end of the tube, rotating the tube and element and effecting a second fastening operation spaced from the first, and alternately rotating the tube and fastening the lateral extension of the inner marginal portion of the element at spaced points along successive convolutions to permanently secure the buffing element to the core member.

10. The method of making a helically wound type of buffing roll which comprises the steps of placing a preformed helically shaped buffing element, having a metallic band provided with a lateral extension secured to its inner marginal edge, in surrounding relation to a tubular metal member, and welding the lateral extension of the band to the tubular member.

11. The method of making a helically wound type of buffing roll unit which comprises the steps of placing a helically shaped buffing element, having a metal band provided with a lateral extension secured to its inner marginal edge, in surrounding relation to a tubular metal core member, spot welding the leading end of the lateral extension of the band adjacent one end of the tube, rotating the tube and element through a short arc and applying a second spot weld in spaced relation to the first, and alternately rotating the tube and spot welding the band at spaced points along the lateral extension of successive convolutions to permanently secure the buffing element to the core member.

12. The method of making a helically wound type of buffing roll as defined in claim 11 wherein the tube and its attached buffing element is rotated spirally outward through a predetermined arc and outward movement to determine the spacing of the spot welds and the pitch of successive convolutions of the buffing element.

13. The method of making a helically wound type of buffing roll which comprises the steps of securing a helically shaped relatively rigid band to the inner marginal edge of a strip of buffing material to provide a helically formed buffing element, placing the helically formed buffing element in surrounding relation to a cylindrical core member, and permanently securing the inner marginal portions of the convolutions of the band to the cylindrical core member.

14. The method of making a helically wound type of buffing roll which comprises the steps of securing a helically shaped metal band to the inner marginal edge of a strip of buffing material to provide a helically formed buffing element having the buffing material extended radially from the helical band, placing the helically formed buffing element in surrounding relation to a tubular metal member, and welding the band to the tube.

15. The method of making a buffing roll which comprises the steps of securing the inner marginal portions of a plurality of buffing members to a helically shaped metal band to provide a helically formed buffing element having the buffing members extended radially from the helical band, placing the helically formed buffing element in surrounding relation to a tubular metal member, spot welding the leading end of the band adjacent the leading end of the tubular member, rotating the tube spirally outward a short distance and applying a second spot weld spaced from the first, and alternately rotating the tube and spot welding the band at spaced points to permanently secure the buffing element to the core member.

16. The method of making a buffing roll which comprises the steps of placing a helically formed buffing element having a marginal metal band provided with a lateral extension in surrounding relation on a core member, welding the leading portion of the lateral extension of the buffing element adjacent the leading end of the core member, continuously rotating the core member and moving the same spirally outwardly while continuously welding the lateral extension of the buffing element to the core member.

References Cited by the Examiner
UNITED STATES PATENTS

| | | | |
|---|---|---|---|
| 2,261,136 | 11/41 | Brown | 29—157.3 X |
| 2,553,748 | 5/51 | Carlson et al. | 300—21 X |
| 2,752,202 | 6/56 | Schloss | 51—193 X |
| 2,787,017 | 4/57 | Abbrecht | 300—21 X |
| 2,871,631 | 2/59 | Churchill | 51—193 |
| 3,065,481 | 11/62 | Peterson | 300—21 X |

GRANVILLE Y. CUSTER, JR., *Primary Examiner.*